(12) United States Patent
Lin

(10) Patent No.: US 9,161,623 B1
(45) Date of Patent: Oct. 20, 2015

(54) TABLETOP LINKING DEVICE

(71) Applicant: Zhuhai Shichang Metals Ltd., Zhuahi (CN)

(72) Inventor: Wen-Sheng Lin, Kaohsiung (TW)

(73) Assignee: Zhuhai Shichang Metals Ltd. (CN)

( * ) Notice: Subject to any disclaimer, the term of this patent is extended or adjusted under 35 U.S.C. 154(b) by 0 days.

(21) Appl. No.: 14/253,242

(22) Filed: Apr. 15, 2014

(51) Int. Cl.
| | |
|---|---|
| *A47B 57/00* | (2006.01) |
| *A47B 87/00* | (2006.01) |
| *A47B 13/08* | (2006.01) |
| *F16B 2/22* | (2006.01) |
| *F16B 5/06* | (2006.01) |

(52) U.S. Cl.
CPC .............. *A47B 87/002* (2013.01); *A47B 13/083* (2013.01); *F16B 2/22* (2013.01); *F16B 5/0664* (2013.01); *F16B 2005/0678* (2013.01)

(58) Field of Classification Search
CPC ................................. A47B 7/002; F16D 1/116
USPC ........... 108/64, 72, 65, 90; 248/639; 403/321, 403/325, 322.1, 326, 330, 338, 367
See application file for complete search history.

(56) References Cited

U.S. PATENT DOCUMENTS

| | | | | | |
|---|---|---|---|---|---|
| 1,009,902 | A | * | 11/1911 | Hanson ............................ | 108/89 |
| 2,619,394 | A | | 11/1952 | Mahr | |
| 2,759,779 | A | * | 8/1956 | Bergman ...................... | 52/582.2 |
| 2,836,475 | A | * | 5/1958 | Sapp ................................ | 108/64 |
| 3,103,185 | A | * | 9/1963 | McGuirk ......................... | 108/64 |
| 3,342,147 | A | | 9/1967 | Shettles | |
| 3,915,100 | A | | 10/1975 | Sullivan | |
| 4,165,908 | A | * | 8/1979 | Cooper et al. ................... | 108/64 |
| 4,409,906 | A | * | 10/1983 | Alneng .............................. | 108/64 |
| 4,591,289 | A | * | 5/1986 | Vickers et al. ................... | 108/64 |
| 4,665,836 | A | | 5/1987 | Burr | |
| 4,915,034 | A | * | 4/1990 | Grabe et al. ...................... | 108/64 |
| 5,144,888 | A | * | 9/1992 | Heine et al. ...................... | 108/64 |
| 5,182,996 | A | | 2/1993 | Gutgsell | |
| 5,341,749 | A | * | 8/1994 | Noakes ............................ | 108/64 |
| 5,560,302 | A | * | 10/1996 | Diffrient et al. ................ | 108/64 |
| 5,678,948 | A | * | 10/1997 | White ............................... | 108/64 |
| 5,794,545 | A | | 8/1998 | McDaniel et al. | |
| 5,927,214 | A | * | 7/1999 | Schwartz et al. ................ | 108/64 |
| 6,048,127 | A | * | 4/2000 | Kern et al. ...................... | 403/389 |
| 6,158,358 | A | * | 12/2000 | Prendergast ..................... | 108/64 |
| 6,382,109 | B1 | * | 5/2002 | Novikoff .......................... | 108/65 |
| 6,397,762 | B1 | * | 6/2002 | Goldberg et al. ................ | 108/64 |
| 6,598,542 | B2 | | 7/2003 | Goldberg et al. | |
| 7,469,645 | B2 | | 12/2008 | Mangano et al. | |
| 8,915,198 | B2 | * | 12/2014 | Massimini ....................... | 108/64 |
| 2013/0302085 | A1 | * | 11/2013 | King .............................. | 403/188 |

* cited by examiner

*Primary Examiner* — Jose V Chen

(74) *Attorney, Agent, or Firm* — Luedeka Neely Group, P.C.

(57) ABSTRACT

A tabletop linking device for removably linking together a perimeter edge of a first table to an abutting perimeter edge of an adjacent second table. Each perimeter edge has a perimeter lip member extending away from a bottom surface of the corresponding tabletop. The second table includes a recess along an inner wall of the perimeter lip. A connection member is pivotally connected to a base member on the bottom surface of the first table. The connection member rotates between a stowed position and a latched position. In the latched position, the ridge engages the recess to removably link the perimeter edge of the first and second tables together.

18 Claims, 6 Drawing Sheets

TABLETOP LINKING DEVICE

FIELD

This invention relates to tables. More particular, this invention relates to a tabletop linking device for use in connection with linking two or more tables together.

BACKGROUND

Blow-molded plastic tabletops have been used for many years on banquet tables, utility tables and other portable folding tables. Due to their versatility and relatively lightweight, blow-molded tables are ideal for banquet settings, conventions, meetings, etc., where tables are often rearranged and reconfigured to suit a variety of needs. Often in these types of applications, tables are configured end-to-end in order to provide a longer table surface than that offered by a single tabletop. However, no blow-molded tabletops have been developed that may be arranged and quickly secured and unsecured while in an end-to-end or side-to-side configuration.

Therefore, what is needed is a tabletop linking device that permits blow-molded tables to be quickly and easily arranged and secured or unsecured while in an end-to-end or side-to-side configuration.

SUMMARY

The above and other needs are met by a tabletop linking device configured for removably linking together a perimeter edge of a first tabletop to an abutting perimeter edge of an adjacent second tabletop. The perimeter edge of the first and second tabletops each comprise a perimeter lip member extending away from a bottom surface of the tabletop. The second tabletop further includes a recess along an inner wall of the perimeter lip.

The tabletop linking device includes a base member having a base plate that is configured for fixed attachment to the bottom surface of the first tabletop adjacent an inner wall of the perimeter lip. In particular, an attachment member fixedly attaches the base plate to the bottom surface of the first tabletop. A first support member extends away from a first side of the base member and a second support member extends away from a second side of the base member and is parallel with the first support member. A hinge member is positioned between the first and second support members and is oriented such that it is parallel with the bottom surface of the first tabletop. In certain embodiments, components of the tabletop linking device, such as the base member and the connection member, are constructed from plastic and may be injection molded.

A connection member includes an elongate central portion having first and second ends, a first shoulder member and a second shoulder member. The first shoulder member is joined at an angle with respect to the first end of the elongate central portion. The second shoulder member is joined at an angle with respect to the second end of the elongate central portion. In some embodiments, the second shoulder member is parallel with the first shoulder member. In some embodiments, a first side of the elongate central portion includes a plurality of ridge members, which reduces overall weight and maintains rigidity.

The connection member is configured to rotate between a stowed position and a latched position. The first shoulder member is pivotally connected by the hinge member to the base member between the first and second support members. In the stowed position, the elongate central portion runs along the bottom surface of the first tabletop and the first and second shoulder members extend outwards away from the bottom of the first tabletop. In certain embodiments, the first side of the elongate central portion includes a notch that is sized and configured to receive at least a portion of the attachment member when the connection member is in the stowed position.

In the latched position, the elongate central portion runs across the adjacent perimeter lips of the first and second tabletops and the first shoulder portion extends towards the bottom surface of the first tabletop and the second shoulder portion extends towards the bottom of the second tabletop. An inner face of the second shoulder member includes a ridge that is configured to engage the recess in the perimeter lip of the second tabletop, which secures the connection member in the latched position. Certain embodiments may include a grip feature that is located at an intersection of the elongate central portion and the second shoulder member. The grip feature includes a recess located on an outer face of the second shoulder member that assists a user in disengaging the ridge from the recess and for pivoting the connection member from the latched position to the stowed position.

In certain embodiments, the tabletop linking device may also include a flexible clip member that is joined to the base plate. The flexible clip member is configured to extend along the inner wall of the perimeter lip of the first tabletop and provides contact pressure to the connection member. In particular, a first surface of the flexible clip member contacts an outer face of the first shoulder member when the connection member is in the stowed position. Additionally, the first surface of the flexible clip member contacts an inner face of the first shoulder member when the connection member is in the latched position.

Further details of each of these and other embodiments of the invention are provided in the drawings and detailed description.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
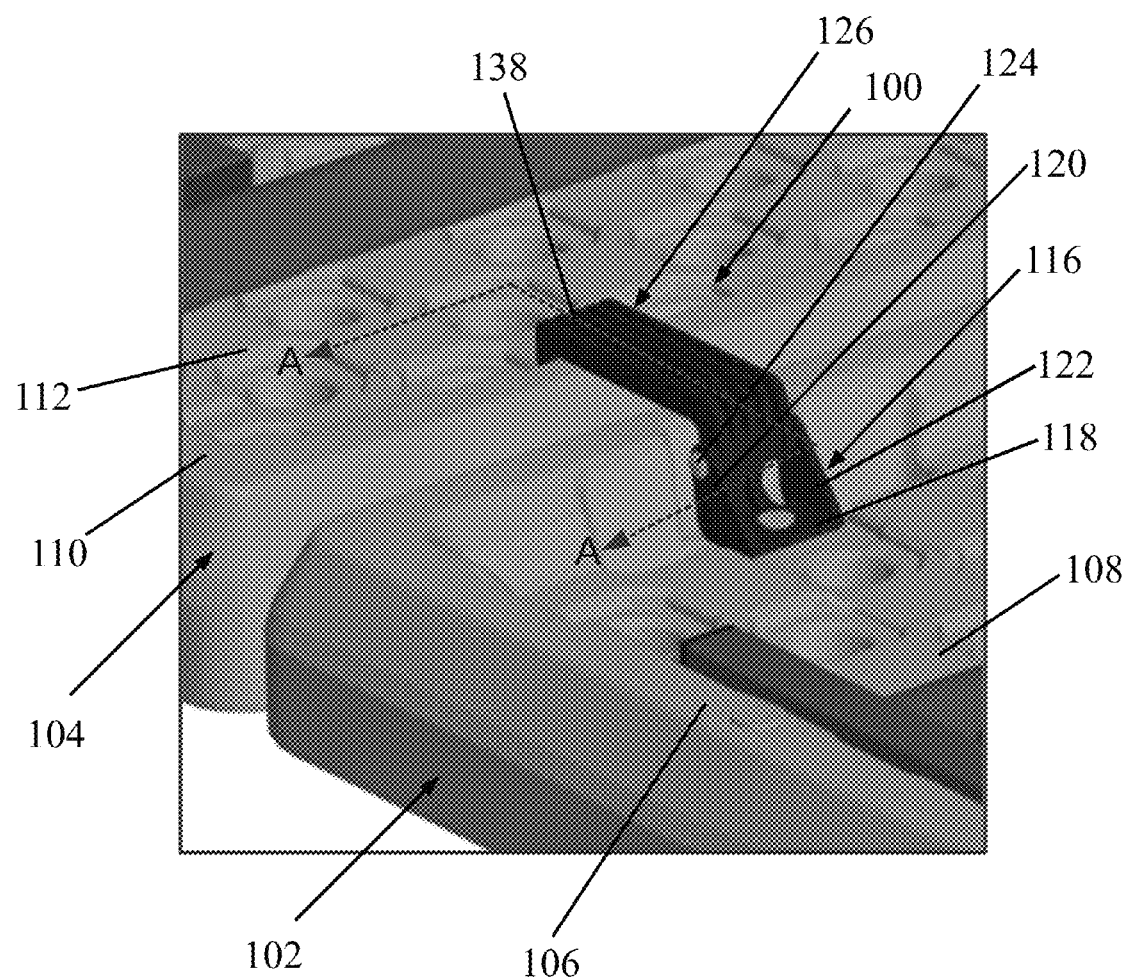
FIG. 1 is a perspective view depicting a tabletop linking device in a latched position according to an embodiment of the present invention.

In the description with follow, like parts are marked throughout the specification and drawings with the same reference numerals. The drawings are not necessarily to scale and the proportions of certain parts have been exaggerated and/or shown in schematic form in the interest of clarity and conciseness.

With reference now to the figures and, in particular, to FIG. 1, there is provided a tabletop linking device 100 according to an embodiment of the present invention. The tabletop linking device 100 is configured to removably link together a first tabletop 102 and a second tabletop 104. In certain preferred embodiments, the tabletops are formed from blow-molded plastic.

The first tabletop 102 has a perimeter edge that includes a perimeter lip member 106 that extends away from a bottom surface 108 of the first tabletop. Similarly, the second tabletop 104 has a perimeter edge that includes a perimeter lip member 110 that extends away from a bottom surface 112 of the second tabletop. When the first tabletop 102 is linked to the second table, the perimeter edges abut one another such that the perimeter lips 106, 110 are adjacent to and coextensive with one another. As shown best in FIG. 2, the second tabletop 104 includes a recess 114 formed along an inner wall of the perimeter lip 110.

Figure 2:
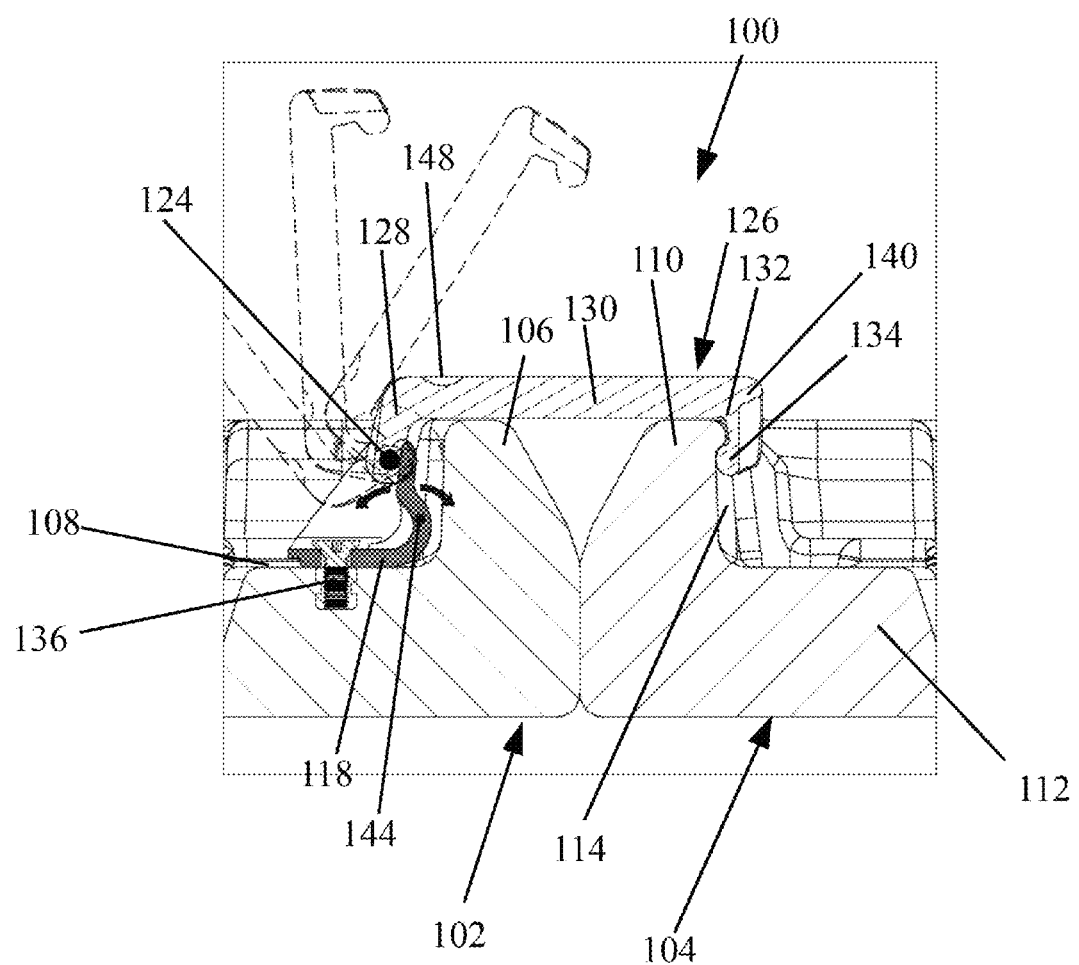
FIG. 2 is a cross-sectional view of the tabletop linking device of FIG. 1 depicting the rotation of a connection member to a latched position and shown generally along line A-A.

With reference to FIGS. 1 and 2, the tabletop linking device 100 includes a base member 116 having base plate 118 that is configured for fixed attachment to the bottom surface 108 of the first tabletop 102 adjacent an inner wall of the perimeter lip 106 via an attachment member 136. In certain embodiments, the attachment member 136 comprises a threaded bolt and nut. As shown in FIG. 2, the nut may be formed into a portion of the bottom surface 108 of the tabletop 102.

The base member 116 includes a first support member 120 extending away from a first side of the base member 116 and a second support member 122 extending away from a second side of the base member and parallel with the first support member. A hinge member 124 extends between the first and second support members 120, 122 and is parallel with the bottom surface 108. A flexible clip member 144 is joined to the base plate 118 and extends along the inner wall of the perimeter lip 106.

A connection member 126 has a first shoulder member 128 joined substantially orthogonally to a first end of an elongate central portion 130 and a second shoulder member 132 joined substantially orthogonally at a second end of the elongate central portion. The first and second shoulder members 128, 132 are preferably substantially parallel with one another. The first shoulder member 128 is pivotally connected by the hinge member 124 to the base member 116 between the first and second support members 120, 122.

Figure 3:
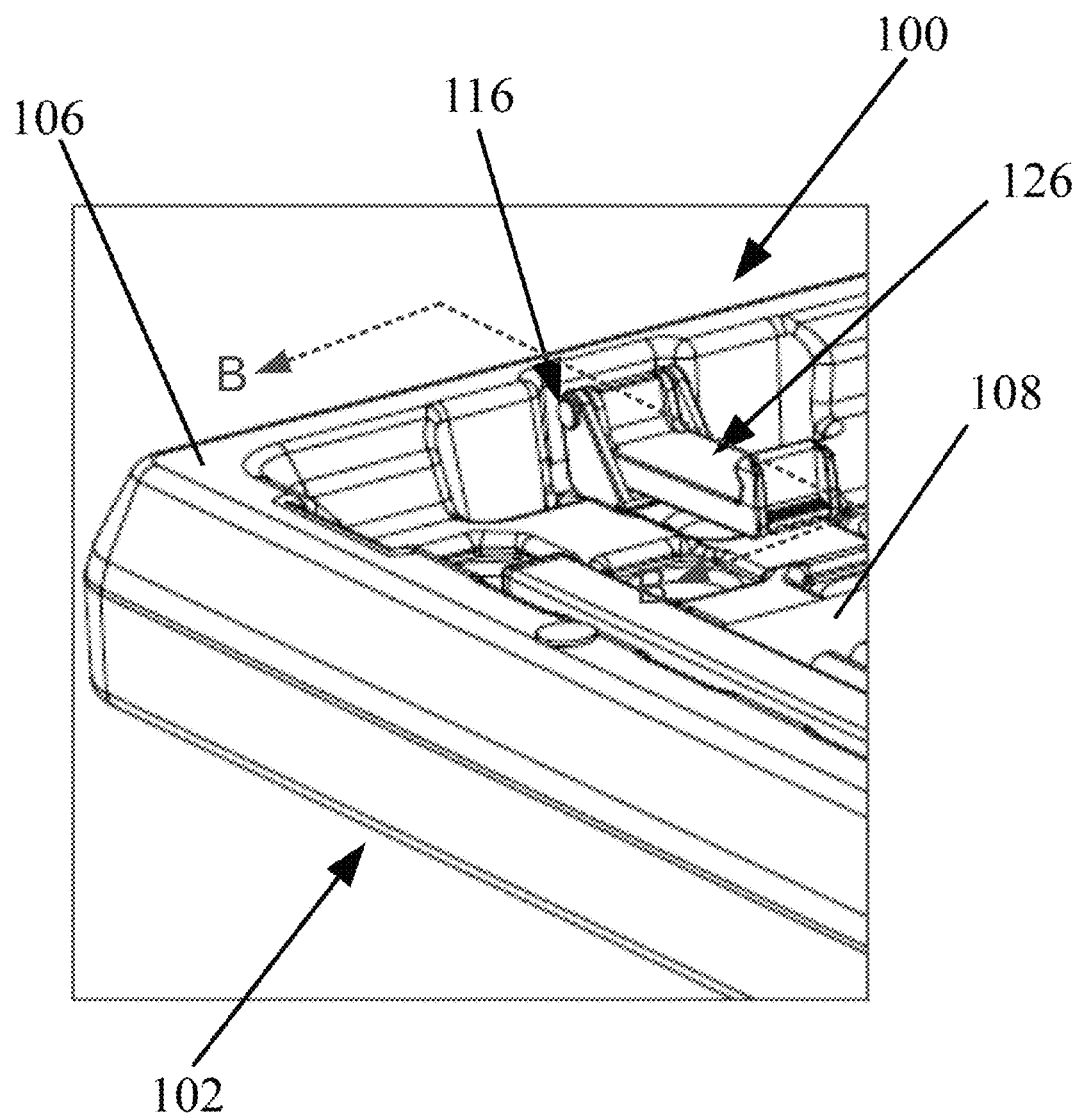
FIG. 3 is a perspective view of a tabletop linking device shown in a stowed position according to an embodiment of the present invention.
Figure 4:
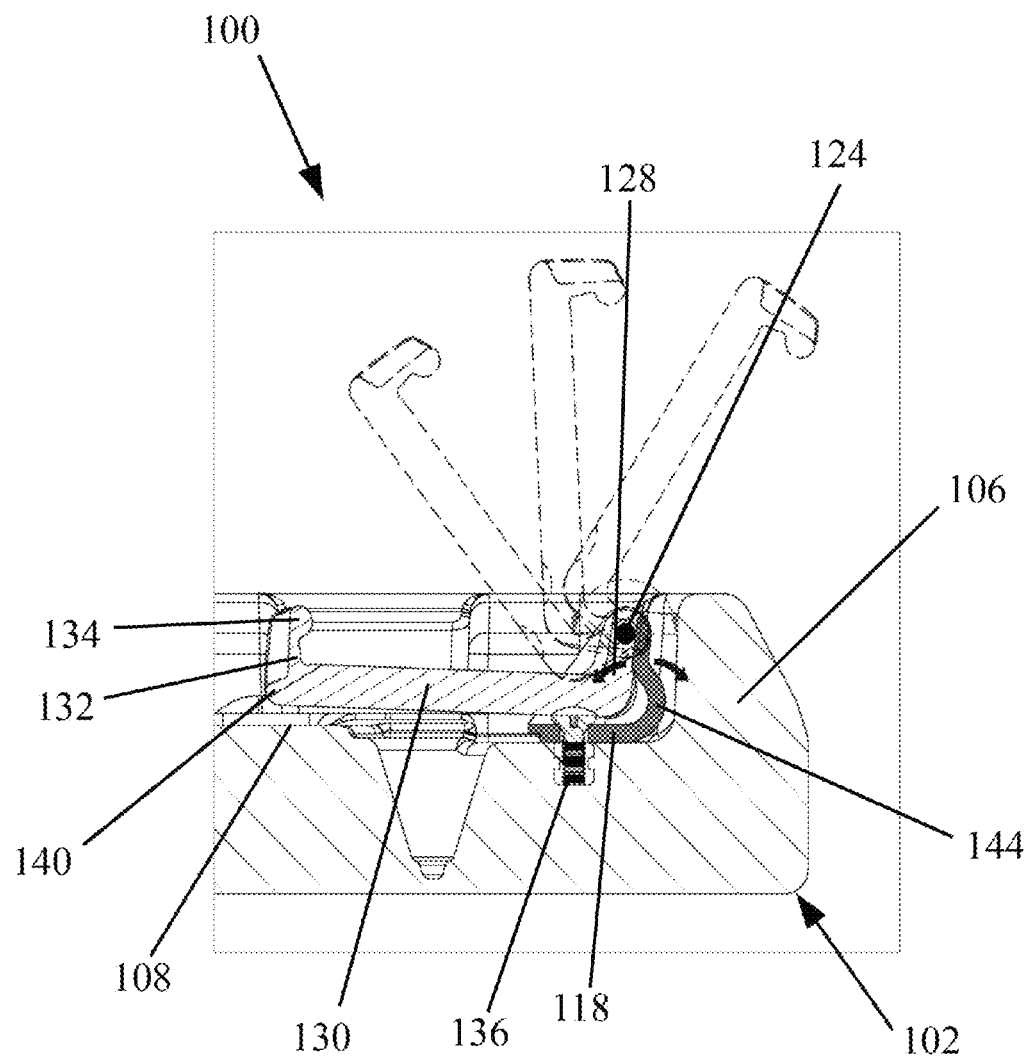
FIG. 4 is a cross-sectional view of the tabletop linking device of FIG. 3 depicting the rotation of the connection member away from a stowed position and shown generally along line B-B.

The connection member 126 may rotate between a latched position (FIGS. 1 and 2) and a stowed position (FIGS. 3 and 4). As shown in FIG. 3, when the connection member 126 is in the stowed position, the elongate central portion 130 is disposed along the bottom surface 108 of the first tabletop 102 and the first and second shoulder members 128, 132 extend outwards away from the bottom surface of the first tabletop. Additionally, when in the stowed position as shown in FIG. 4, the flexible clip member 144 applies pressure against the outer surface of the first shoulder member 128. This pressure maintains the connection member 126 in the stowed position. As shown in FIG. 2, the elongate central portion 130 may include a notch 148 that is configured to receive a portion of the attachment member 136 extending above the base plate 118 when the connection member 126 is in the stowed position.

The connection member 126 is rotated from the stowed position to the latched position in order to link together two adjacent tables. As shown in FIG. 2, when the connection member 126 is in the latched position, the elongate central portion 130 is disposed across the perimeter lips 106, 110 of the first and second tables 102, 104. Also, in the latched position, the first shoulder portion 128 extends towards the bottom surface 108 of the first tabletop 102 and the second shoulder portion 132 extends towards the bottom surface 112 of the second tabletop 104. An inner face of the second shoulder member 132 includes a ridge 134 that is configured to engage one wall of the recess 114. The ridge 134 engages the wall of the recess 114 when the connection member 126 is in the latched position, which forms a secure connection between the first and second tables 102, 104. The flexible clip member 144 applies pressure against an inner surface of the first shoulder member 128, which pressure maintains the connection member 126 in the latched position.

In certain embodiments, an outer face of the second shoulder member 132 includes a cutout that forms a gripping feature 140 near the intersection of the second shoulder member 132 and the elongate central portion 130. The gripping feature 140 may be used to assist a user to pull and disengage the ridge 134 from the recess 114 while pivoting the connection member 126 from the latched position to the stowed position.

As shown best in FIG. 1, in certain embodiments, a first side of the elongate central portion 130 comprises a plurality of ridge members 138. The ridge members 138 provide strength and rigidity to the connection member 126 while permitting the weight and amount of material required to manufacture the connection member to be minimized.

Figure 5:
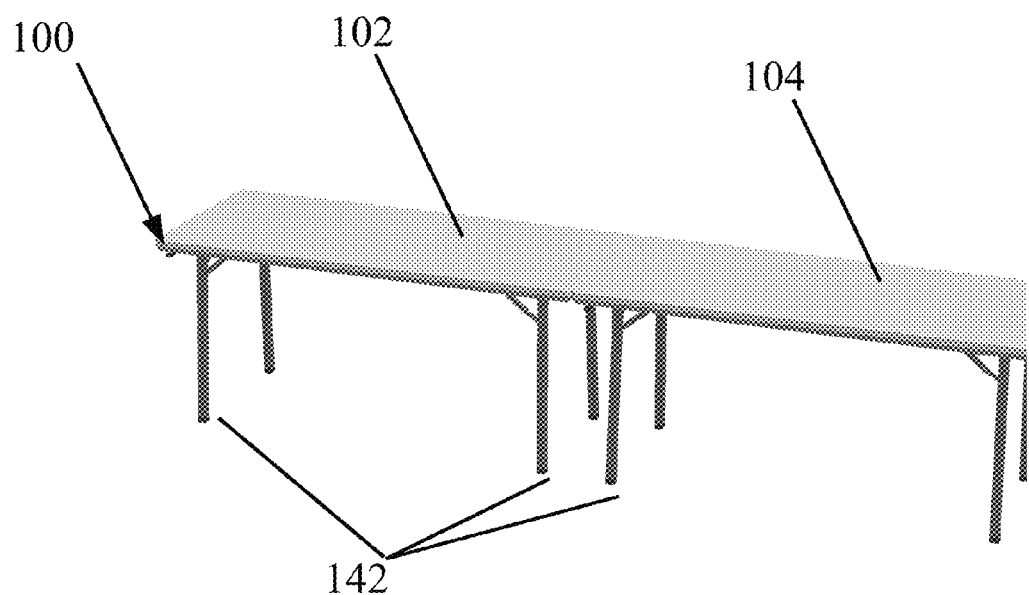
FIG. 5 is a perspective view depicting a pair of tables joined together in an end-to-end configuration according to an embodiment of the present invention.
Figure 6:
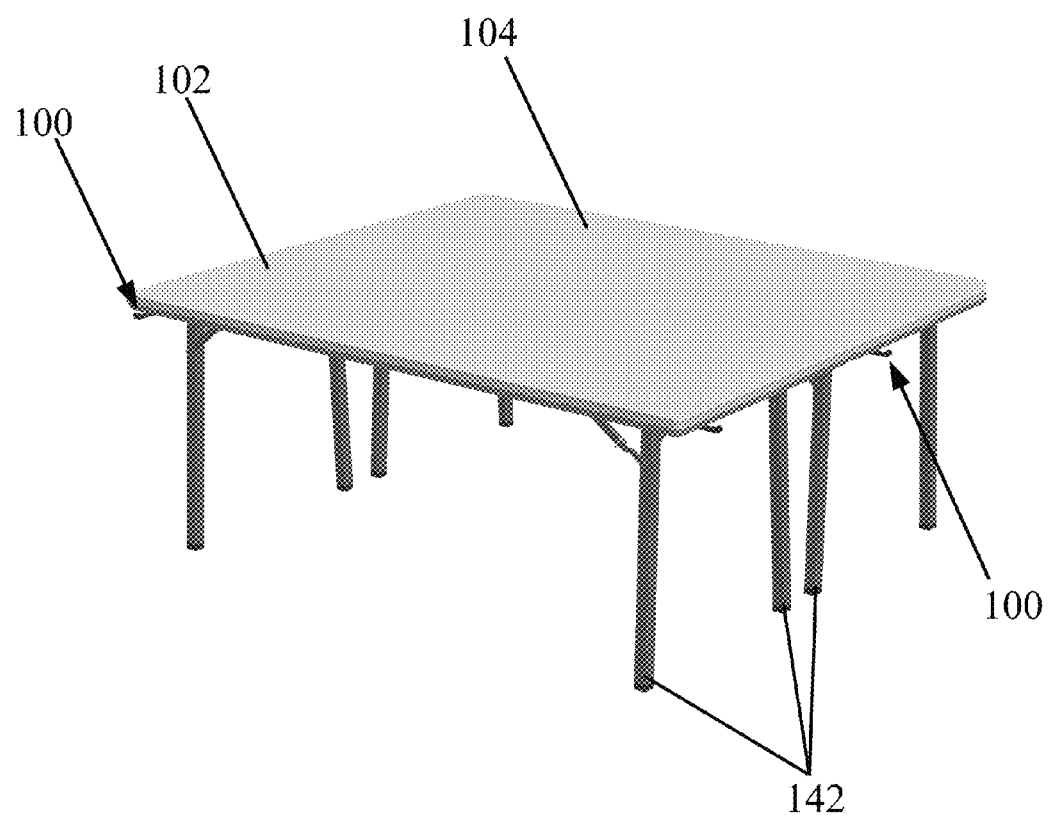
FIG. 6 is a perspective view depicting a pair of tables joined together in a side-to-side configuration according to an embodiment of the present invention.

In use, the tabletop linking device 100 enables two or more tables to be quickly linked together in a variety of configurations. For example, two rectangular tabletops 102, 104, each supported by a plurality of support legs 142, are shown linked together in an end-to-end configuration in FIG. 5 and in a side-to-side configuration in FIG. 6.

To secure two tables together, the tabletops are first placed in close approximation to one another such that the perimeter edge of the first tabletop abuts the perimeter edge of the second tabletop. The connection member on the first tabletop is aligned with the recess in the second tabletop. The connection member is then moved from the stowed position to the latched position. The ridge engages the recess in order to secure the connection member in the latched position. By dis-engaging the ridge from the recess and moving the connection member back to the stowed position, the tables may be quickly unlinked.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A tabletop linking device configured for removably linking together perimeter edges of tabletops of two adjacent tables, the tabletop linking device comprising:

a base member comprising a base plate, a first support member extending away from a first side of the base member and a second support member extending away from a second side of the base member and parallel with the first support member;

an attachment member operable to fixedly attach the base plate to a bottom surface of a tabletop of the two adjacent tables;

a hinge member extending between the first and second support members;

a connection member comprising:

an elongate central portion having first and second ends;

a first shoulder member joined at an angle with respect to the first end of the elongate central portion, the first shoulder member pivotally connected by the hinge member to the base member between the first and second support members; and and a second shoulder member joined at an angle with respect to the second end of the elongate central portion, the second shoulder member having an inner face comprising a ridge, wherein the connection member is configured to rotate between a stowed position and a latched position.

2. The tabletop linking device of claim 1 further comprising a flexible clip member joined to the base plate and configured to provide contact pressure against the connection member, wherein the flexible clip member provides contact pressure against an outer face of the first shoulder member when the connection member is in the stowed position and wherein the flexible clip member provides contact pressure against an inner face of the first shoulder member when the connection member is in the latched position.

3. The tabletop linking device of claim 1 wherein the base member and the connection member are plastic.

4. The tabletop linking device of claim 3 wherein the base member and the connection member are injection molded.

5. The tabletop linking device of claim 1 wherein a first surface of the elongate central portion comprises a plurality of ridge members.

6. The tabletop linking device of claim 1 wherein a first side of the elongate central portion comprises a notch sized and configured to receive at least a portion of the attachment member when the connection member is in the latched position.

7. The tabletop linking device of claim 1 further comprises a grip feature disposed proximate an intersection of the elongate central portion and the second shoulder member, the grip feature comprising a recess disposed along an outer face of the second shoulder member, the grip feature operable to assist a user in pivoting the connection member from the latched position to the stowed position.

8. A table comprising:

a first tabletop having:

a top surface;

a bottom surface;

a perimeter edge; and a perimeter lip having an inward facing surface and an outward facing surface, the perimeter lip formed along at least a portion of the perimeter edge of the first tabletop and extending away from the bottom surface;

a plurality of support legs; and a tabletop linking device comprising:

a base member comprising a base plate configured for fixed attachment to the bottom surface of the first tabletop adjacent the inward facing surface of the perimeter lip, a first support member extending away from a first side of the base member and a second support member extending away from a second side of the base member and parallel with the first support member;

a hinge member extending between the first and second support members and disposed parallel with the bottom surface of the first tabletop;

a connection member comprising:

an elongate central portion having first and second ends;

a first shoulder member joined substantially orthogonally to the first end of an elongate central portion, wherein the first shoulder member is pivotally connected by the hinge member to the base member between the first and second support members; and a second shoulder member joined substantially orthogonally to the second end of the elongate central portion and parallel with the first shoulder portion, the connection member configured to rotate between a stowed position wherein the elongate central portion is disposed along the bottom surface of the first tabletop and the first and second shoulder members extend outwards away from the bottom surface of the first tabletop, and a latched position wherein the elongate central portion is disposed across the perimeter lip of the first tabletop and wherein the first shoulder member extends towards the bottom surface of the first table; and an attachment member for fixedly attaching the base plate to the bottom surface of the first tabletop.

9. The table of claim 8 wherein the tabletop linking device further comprises a flexible clip member joined to the base plate and configured to extend along the inner wall of the perimeter lip of the first tabletop and to provide contact pressure against the connection member, wherein the flexible clip member provides contact pressure against an outer face of the first shoulder member when the connection member is in the stowed position and wherein the flexible clip member provides contact pressure against an inner face of the first shoulder member when the connection member is in the latched position.

10. The table of claim 8 wherein the base member and the connection member are plastic.

11. The table of claim 10 wherein the base member and the connection member are injection molded.

12. The table of claim 10 wherein a first surface of the elongate central portion comprises a plurality of ridge members.

13. The tabletop linking device of claim 8 wherein a first side of the elongate central portion comprises a notch sized and configured to receive at least a portion of the attachment member when the connection member is in the latched position.

14. A tabletop linking system comprising:

a first tabletop having a top surface and a bottom surface, a perimeter lip having an inward facing surface and an outward facing surface, the perimeter lip formed along at least a portion of a perimeter edge of the first tabletop and extending away from the bottom surface;

a second tabletop having a top surface and a bottom surface, a perimeter lip having an inward facing surface and an outward facing surface, the perimeter lip formed along at least a portion of a perimeter edge of the second tabletop and extending away from the bottom surface, and a recess disposed in the inward facing surface of the perimeter lip, wherein the second tabletop is disposed immediately adjacent the first tabletop such that the outward facing surface of the perimeter lip of the second tabletop is disposed immediately adjacent the outward facing surface of the perimeter lip of the first tabletop; and a tabletop linking device comprising:

a base member comprising a base plate configured for fixed attachment to the bottom surface of the first tabletop adjacent the inward facing surface of the perimeter lip, a first support member extending away from a first side of the base member and a second support member extending away from a second side of the base member and parallel with the first support member;

an attachment member for fixedly attaching the base plate to the bottom surface of the first tabletop;

a hinge member extending between the first and second support members and parallel with the bottom surface of the first tabletop;

a connection member comprising:

an elongate central portion having first and second ends;

a first shoulder member joined at an angle with respect to the first end of the elongate central portion, the first shoulder member pivotally connected by the hinge member to the base member between the first and second support members; and and a second shoulder member joined at an angle with respect to the second end of the elongate central portion, the second shoulder member having an inner face comprising a ridge, wherein the connection member is configured to rotate between a stowed position in which the elongate central portion is disposed along the bottom surface of the first tabletop and the first and second shoulder members extend outward away from the bottom surface of the first tabletop, and a latched position in which the elongate central portion is disposed across the adjacent perimeter lips of the first and second tabletops, in which the first shoulder portion extends toward the bottom surface of the first tabletop and the second shoulder portion extends toward the bottom surface of the second tabletop, and in which the ridge on the inner face of the second shoulder member engages the recess in the inward facing surface of the perimeter lip of the second tabletop.

15. The tabletop linking system of claim 14 wherein the first and second tabletops are rectangular in shape, each tabletop having opposing first and second side portions and opposing first and second end portions.

16. The tabletop linking system of claim 15 wherein the first and second tabletops are configured for linking in an end-to-end configuration.

17. The tabletop linking system of claim 15 wherein the first and second tabletops are configured for linking in a side-to-side configuration.

18. The tabletop linking system of claim 14 wherein the tabletop linking device further comprises a flexible clip member joined to the base plate and configured to extend along the inner wall of the perimeter lip of the first tabletop and to provide contact pressure against the connection member, wherein the flexible clip member provides contact pressure against an outer face of the first shoulder member when the connection member is in the stowed position and wherein the flexible clip member provides contact pressure against an inner face of the first shoulder member when the connection member is in the latched position.

\* \* \* \* \*